(12) United States Patent
Smith

(10) Patent No.: US 8,270,584 B2
(45) Date of Patent: Sep. 18, 2012

(54) REMOTELY CONTROLLED SPEAKERPHONE PROVIDING ACCESS SECURITY

(76) Inventor: Tierney Winston Smith, Los Altos Hills, CA (US)

( * ) Notice: Subject to any disclaimer, the term of this patent is extended or adjusted under 35 U.S.C. 154(b) by 344 days.

(21) Appl. No.: 12/803,076

(22) Filed: Jun. 18, 2010

(65) Prior Publication Data

US 2010/0329441 A1    Dec. 30, 2010

Related U.S. Application Data

(60) Provisional application No. 61/269,574, filed on Jun. 26, 2009.

(51) Int. Cl.
H04M 3/42 (2006.01)

(52) U.S. Cl. ............. 379/201.01; 379/207.11

(58) Field of Classification Search ............. 379/201.01, 379/207.11
See application file for complete search history.

(56) References Cited

U.S. PATENT DOCUMENTS

| 4,266,098 | A |   | 5/1981 | Novak |
| 4,850,013 | A |   | 7/1989 | Rose |
| 4,860,347 | A |   | 8/1989 | Costello |
| 5,276,731 | A | * | 1/1994 | Arbel et al. ............. 379/211.02 |
| 5,604,791 | A |   | 2/1997 | Lee |
| 6,442,249 | B1 |   | 8/2002 | Miller, Jr. |
| 6,618,473 | B1 |   | 9/2003 | Davis |

OTHER PUBLICATIONS

Walker Ameriphone, RC200 Remote Controlled Speakerphone, 2-pages, www.ameriphone.com, Garden Grove, CA, U.S.A., Jun. 18, 2010.

* cited by examiner

Primary Examiner — Quynh Nguyen

(57) ABSTRACT

A phone having activation by password or control codes that are transmitted by an authorized caller for validation of an incoming call and for control of the phone.

18 Claims, 11 Drawing Sheets

REMOTELY CONTROLLED SPEAKERPHONE PROVIDING ACCESS SECURITY

CROSS REFERENCE TO RELATED APPLICATIONS

This application claims the priority date and benefits of U.S. Provisional Application 61/269,574 entitled "Remotely Controlled Speakerphone Providing Access Security" filed Jun. 26, 2009 by Tierney W. Smith which is incorporated herein by reference in its entirety.

BACKGROUND

1. Field

The application generally relates to telephones, speakerphones, hands-free phones, and combination audio and video teleconferencing devices, and more particularly, to such devices with the ability to automatically answer and validate the source of an incoming call using passwords that are supplied by the caller, that result in the automatic activation of the speakerphone, without call recipient intervention.

2. Related Art

Conventional telephones, speakerphones, and audio/video teleconferencing devices are designed to require the presence of a call recipient who is physically and functionally capable of acknowledging the presence of an incoming call, and capable of enabling the device in an effective and timely manner, in order to answer an incoming call, and to hang up or terminate a call when it is finished.

Many conventional devices employ visual and auditory caller identification, notifying a call recipient who must then make a determination about answering the call and interacting with the caller. In an increasing number of telecommunications networks the standards-based caller identification information that is transmitted between ring signals, may be intentionally blocked or not provided by the caller, or is removed by the network, or is intentionally falsified by callers, or is ambiguous and does not clearly identify the individual caller. And in the presence of undesired calls that are ignored or unanswered by the call recipient, these may result in messages that are stored in an answering system or message mail box, that may not be accessible by people with physical or functional disabilities.

In addition to the foregoing, the displays, buttons, and complex user interfaces on many high functionality audio and video telephony devices are extremely complex, and are not sufficient to enable individuals with significant physical and functional disabilities to receive desired incoming calls.

There is a need for speakerphone devices that automatically answer and validate that incoming calls are coming from an authorized caller, prior to automatically activating their audio and/or video one-way or two-way communications functions, without the need for operation or intervention by the call recipient. Examples of situations that illustrate this need include: incoming calls from family or friends to individuals who are physically or functionally unable to answer and operate a telephone or speakerphone, or who because of mobility limitations are unable to access the speakerphone in a timely manner; these may be people who are physically impaired, permanently or temporarily, including people recovering from illness or injury in hospitals, convalescent facilities, nursing homes or similar managed care facilities, or individuals who live in any situation and who have physical or functional impairments or limitations. The need for the devices may also be motivated by other reasons a caller may have to need to establish a one-way or two-way voice or video communication under unilateral caller control.

Further limitations and disadvantages of conventional and traditional telephony devices will become apparent to one skilled in the art, through comparison of such devices set forth in the remainder of this application with reference to the drawings and detailed descriptions.

SUMMARY

Methods and apparatus are described that implement a remotely controlled hands-free audio only, or combination audio and video, telecommunications device, referred to in this application as a "speakerphone", or simply a phone, that automatically activates its audio or combined audio/video communications capabilities, conditioned upon the caller having provided an authorized password and optional initial configuration control codes following automatic call answering, all without intervention or involvement by the call recipient. The password and control codes are transmitted by the caller and received by the speakerphone using standard DTMF (Dual-Tone Multi-Frequency) signaling. The password and optional control codes are transmitted following automatic call answer, during a caller identity validation period. Validation of an authorized caller password is a necessary pre-condition for automatic speakerphone activation and notification of the call recipient that a call has begun. The caller-provided password and control code are validated against an internally stored list of authorized passwords and authorized control codes. After the speakerphone has been activated following validation of an authorized password, additional control codes may be sent by the caller using DTMF signaling, for the purpose of changing operating parameters, terminating the call, and changing modes of operation; modes of operation may include selectively enabling or disabling the speaker, the microphone, and the video display or camera if both are included. The speakerphone described herein provides a means for defining multiple caller passwords, each with unique control code access privileges, and for employing multiple speakerphone units on a common shared network connection, all answering a call simultaneously while the caller may control each of the multiple units separately and individually.

In certain embodiments, the physical means of interconnect between the phone and analog or digital communications networks may include a wired telephone or data connection, or a wireless modem capable of connecting with local or wide-area wireless voice or data networks. The speakerphone audio and video functions may each be either full-duplex or half-duplex.

Methods and apparatus described herein are applicable to wired or wireless telephones, speakerphones, feature phones, or audio/video teleconferencing devices.

Methods and apparatus described herein can be used to implement a remotely controlled hands-free audio, and combination audio and video, telecommunications device, referred to in this application as a "speakerphone", performing automatic activation of its audio or combined audio/video communications functions, with such activation conditioned upon the caller providing an authorized password and other operating control codes following automatic call answering, all without intervention by the call recipient.

Methods and apparatus described herein can be used to allow the password and operating control codes to be transmitted by the caller and received by the speakerphone using standard DTMF (Dual-Tone Multi-Frequency) signaling.

Methods and apparatus described herein can be used to allow such DTMF signaling to be transmitted following automatic call answer, during a caller password validation period during which validation of an authorized caller password is accomplished as a pre-condition of automatic speakerphone activation.

Methods and apparatus described herein can be used to validate a caller-provided password and control code sequence against an internally stored list of authorized passwords and authorized control codes.

Methods and apparatus described herein can be used so that following automatic speakerphone activation and during an authorized call, control codes may be sent by the caller using DTMF signaling, for the purpose of controlling operating parameters and speakerphone modes of operation, and to terminate the call, all without intervention or involvement by the call recipient. Additionally, multiple speakerphones sharing a common or simultaneous network connection with the caller, may each be programmed in advance with a unique serial number identity, enabling them to be addressed individually or collectively as a group, for the purpose of controlling operating parameters and speakerphone modes of operation, and to terminate the call, to individual units, all without intervention or involvement by the call recipient.

Methods and apparatus described herein can be used to enable a speakerphone owner to define multiple caller passwords, each with unique control code access permissions and restrictions that are stored in non-volatile memory.

Methods and apparatus described herein can be used to employ a variety of wired or wireless network communication interfaces or modems and to ensure compatibility with a variety of analog and digital voice and video communications networks and transmission methods.

Methods and apparatus described herein can be used for software control of speakerphone functions by employing a main control processor or microcontroller, with embedded control software, a non-volatile memory for storage of caller identity, password and other configuration data, a full or half-duplex audio processing circuit able to be controlled by the microcontroller, a speaker and microphone, a keypad, an LCD display, function buttons, a ring tone detector, a DTMF/touch-tone decoder and encoder, busy signal or call-dropped signal detector, an on/off hook switch, and for the combination audio and video embodiments, a microcontroller controlled video processing circuit with video display and camera.

Methods and apparatus described herein can be used to enable voice and/or video communications with call recipients who are physically or functionally unable to utilize or operate a conventional wireline or wireless telephone, speakerphone, or other telecommunications devices, including computers employing audio or video interfaces requiring physical interaction by a local user to activate or operate the device.

Methods and apparatus described herein can be used to screen incoming calls for limiting the activation of the speakerphone and notification of the call recipient to only those calls coming from a pre-authorized caller, also enabling different combinations of speakerphone functionality per-caller, based upon pre-defined password-specific control-code access permissions.

Methods and apparatus described herein can be used for caller-provided passwords sent as DTMF signals, as opposed to network-provided caller-ID data, enabling callers to be consistently correctly identified when calling from any phone or network, and additionally allows the speakerphone to provide the call recipient with accurate textual, visual, or audible speech announcement of the caller's identity.

Methods and apparatus described herein can be used to provide a means for an authorized caller to control operating modes and functions, including whether or not to enable one-way monitoring only, or full two-way communications. Examples of this capability include caller enabling of only the speakerphone's microphone, or only the video camera, with or without call recipient notification, to provide a means for unobtrusive health and welfare monitoring, or to ascertain whether or not the call recipient is available to participate in a call.

Methods and apparatus described herein can be used so that multiple speakerphone devices can share a common network connection and be placed in different rooms of the same facility and be activated simultaneously upon caller password validation, to locate and communicate with the call recipient in any room; and as a result of the ability described above to allow individual speakerphones to be uniquely addressable and individually controlled, this provides the caller with the ability to use the control code facility to selectively de-activate individual speakerphones that are not needed for a conversation once the call recipient has been located.

Methods and apparatus described herein can be used to provide a secure and caller-controlled means for callers and call recipients to participate in cross-media or mixed-media communications involving arbitrary combinations of human speech, computer-synthesized speech, computer recognized speech, live video, computer-generated video, and textual or other graphical means of visual communications, including animation and sign language. Such cross-media communications can be accomplished using network operator-based or Internet-based computing resources or services, or caller-provided computing or media conversion capabilities.

These and other examples for the methods and apparatus will no doubt become obvious to those of ordinary skill in the art, after having read the following detailed description of embodiments which are illustrated in various figures.

DETAILED DESCRIPTION

The phone employs a main control processor or microcontroller with embedded control software, both referred to together as the "microcontroller" in the following descriptions.

Figure 1:
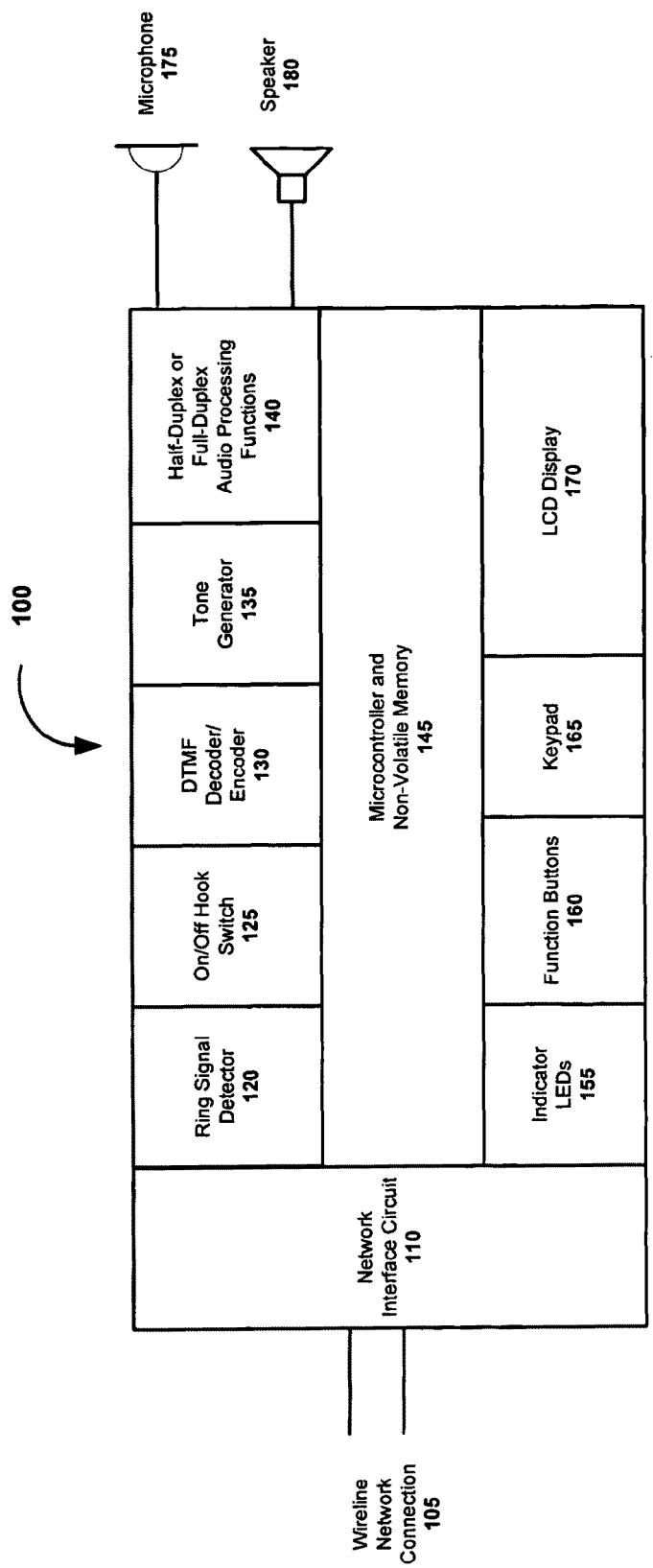
FIG. 1 is a system function diagram of a remotely controlled audio speakerphone employing a wireline network connection.

FIG. 1 is a system function diagram illustrating an embodiment of a remotely controlled audio speakerphone 100 that interfaces with a conventional analog or digital wireline telephone or data network 105. The speakerphone 100 employs a network interface circuit 110 that provides line isolation, signal conditioning, modulation and demodulation or encoding and decoding of the received and transmitted audio signals as required by the network protocol. In addition, the network interface circuit 110 includes circuitry to detect dial tone, busy signals, and fast-busy signals, or other call disconnect signaling, providing such detection data to the microcontroller. A ring signal or incoming call request message detector 120 monitors incoming signaling to provide the microcontroller 145 with a means to count incoming ring or call request signals. When a specified number of ring signals are detected 120, the microcontroller 145 sets the hook switch 125 in its off-hook state, in accordance with the requirements of the particular network protocol, to answer the incoming call. When the microcontroller has answered the incoming call, and a two-way connection has been established, the caller is audibly prompted by the microcontroller 145 to begin sending a caller password using dual-tone multi-frequency (DTMF) signaling. This audible password prompt is sent only to the caller, and is provided by the tone generator 135 which is enabled for this purpose by the microcontroller 145. Following the audible prompt to the caller, the incoming password is received and decoded by the DTMF decoder circuit 130, providing the microcontroller 145 with a digital representation of the DTMF signaling. This password sequence may also include control codes that are appended to the password and used to configure the initial operating mode and parameters of the speakerphone. The microcontroller 145 compares and validates the password and control codes against a table of authorized passwords and control codes that have been previously programmed by the speakerphone owner and stored in non-volatile memory 145, accessible to the microcontroller. Once the caller-provided password has been validated, the microcontroller 145 causes the tone generator 135 to audibly notify the caller of the activation of the speakerphone audio processing functions 140, and depending upon caller defined mode control parameters, may also audibly and visibly notify the call recipient of the activation of the speakerphone. The audio processor 140, may operate in either full-duplex or half-duplex mode. Upon activation, certain audio processor 140 may be caller-controlled; these are determined by the control code that may have been sent appended to the password and by configuration data stored in non-volatile memory. The audio function modes may include activation of either or both of the microphone 175, and the speaker 180. Various indicator lights 155 are provided for the purpose of indicating the operating state of the speakerphone to the call recipient, and the presence of power. The inclusion of a keypad 165, LCD display 170 and function buttons 160 provide a means for a local user to power on the speakerphone, put the speakerphone in a programming mode for storage of authorized caller identities including passwords, control code permissions, pre-stored speed-dial numbers, and other parameters. Each of multiple speakerphones sharing a common or simultaneous network connection with the caller, such that they would all answer a call, validate the caller password, and activate themselves simultaneously, may be user programmed with unique serial number identities, enabling them to be individually addressable by control codes during a call, allowing the caller to selectively change their individual operating parameters and modes of operation, or to selectively terminate the call to one or more devices that are operating simultaneously on a single call. The function buttons also facilitate the initiation and dialing of outgoing telephone calls in a conventional manner. During normal operation, once a caller's password is validated, the caller's identity may be retrieved from non-volatile memory and displayed for the call recipient as textual information, and as a synthesized or pre-stored voice announcement of the caller's identity. After the speakerphone is in operation and a call is underway, the authorized caller can send DTMF control codes that are decoded in the decoder/encoder 130 and provided to the microcontroller 145 for adjustments of operating parameters and changes of the mode of operation. Controllable operating parameters may include speaker volume, microphone gain, and other audio processing parameters. Controllable modes of operation may include one-way or two-way audio, and a code used to terminate the call, all without intervention or involvement by the call recipient. When a busy signal, fast-busy, or other form of caller disconnect are detected 110, the microcontroller 145 automatically hangs up the current call and resets the speakerphone in a ready state, available to answer and validate an incoming call.

Figure 2:
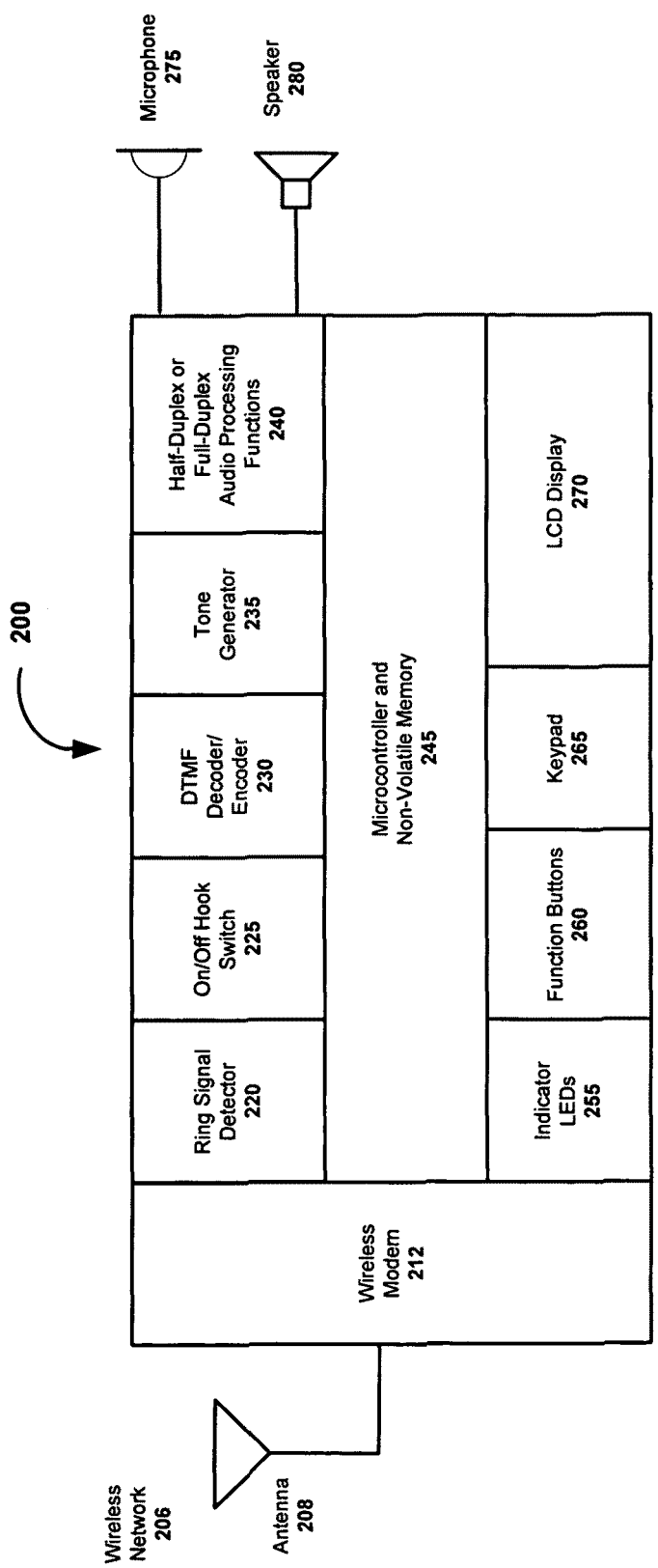
FIG. 2 is a system function diagram of a remotely controlled audio speakerphone employing a wireless network connection.

FIG. 2 is a system function diagram illustrating an embodiment of a remotely controlled audio speakerphone 200 that interfaces with a wireless voice or data network 206. The speakerphone 200 employs a wireless modem 212 with antenna 208, together providing the speakerphone with a network connection for voice calls. In addition, the wireless modem 212 includes circuitry to detect busy and other call connection status signals, providing such detection data to the microcontroller. A ring signal or incoming call request message detector 220 monitors incoming signaling to provide the microcontroller 245 with a means to count incoming ring or call request signals. When a specified number of ring signals are detected 220, the microcontroller 245 sets the hook switch 225 in its off-hook state, in accordance with the requirements of the particular wireless modem 212, to answer the incoming call. When the microcontroller has answered the incoming call, and a two-way connection has been established, the caller is audibly prompted by the microcontroller 245 to begin sending a caller password using DTMF signaling. This audible prompt is sent only to the caller, and is provided by the tone generator 235 which is enabled for this purpose by the microcontroller 245. Following the audible prompt to the caller, the incoming password is received and decoded by the DTMF decoder circuit 230, providing the microcontroller 245 with a digital representation of the DTMF signaling. This password sequence may also include control codes that are appended to the password and used to configure the initial operating behavior of the speakerphone. The microcontroller 245 compares and validates the password and control codes against a table of authorized passwords and control codes that have been previously programmed by the speakerphone owner and stored in non-volatile memory 245, accessible to the microcontroller. Once the caller-provided password has been validated, the microcontroller 245 causes the tone generator 235 to audibly notify the caller of the activation of the speakerphone audio processing functions 240, and depending upon caller defined mode control parameters, may also audibly and visibly notify the call recipient of the activation of the speakerphone. The audio processing functions 240, may operate in either full-duplex or half-duplex mode. Upon activation, certain audio processing functions 240 may be caller-controlled; these are determined by the control code that may have been sent appended to the password and by configuration data stored in non-volatile memory. The audio functions may include activation of either or both of the microphone 275, and the speaker 280. Various indicator lights 255 are provided for the purpose of indicating the operating state of the speakerphone to the call recipient, and the presence of power. The inclusion of a keypad 265, LCD display 270 and function buttons 260 provide a means for a local user to power on the speakerphone, put the speakerphone in a programming mode for storage of authorized caller identities including passwords, control code permissions, pre-stored speed-dial numbers, and other parameters. Each of multiple speakerphones sharing a common or simultaneous network connection with the caller, such that they would all answer a call, validate the caller password, and activate themselves simultaneously, may be user programmed with unique serial number identities, enabling them to be individually addressable by control codes during a call, allowing the caller to selectively change their operating parameters, modes of operation, or to selectively terminate the call to one or more devices that are operating simultaneously on a single call. The function buttons also facilitate the initiation and dialing of outgoing telephone calls in a conventional manner.

Once a caller's password is validated, the caller's identity can be retrieved from non-volatile memory and displayed for the call recipient as textual information, and as a speech synthesized voice announcement of the caller's identity. After the speakerphone is in operation and a call is underway, the authorized caller can send DTMF control codes that are decoded 230 and provided to the microcontroller 245 for adjustments of operating parameters and changes of the mode of operation. Controllable operating parameters may include speaker volume, microphone gain, and other audio processing parameters. Controllable modes of operation may include one-way or two-way audio, and a code used to terminate the call, all without intervention or involvement by the call recipient. When a busy signal, fast-busy, or other form of caller disconnect are detected 212, the microcontroller 245 automatically hangs up the current call and resets the speakerphone in a ready state, available to answer and validate an incoming call.

Figure 3:
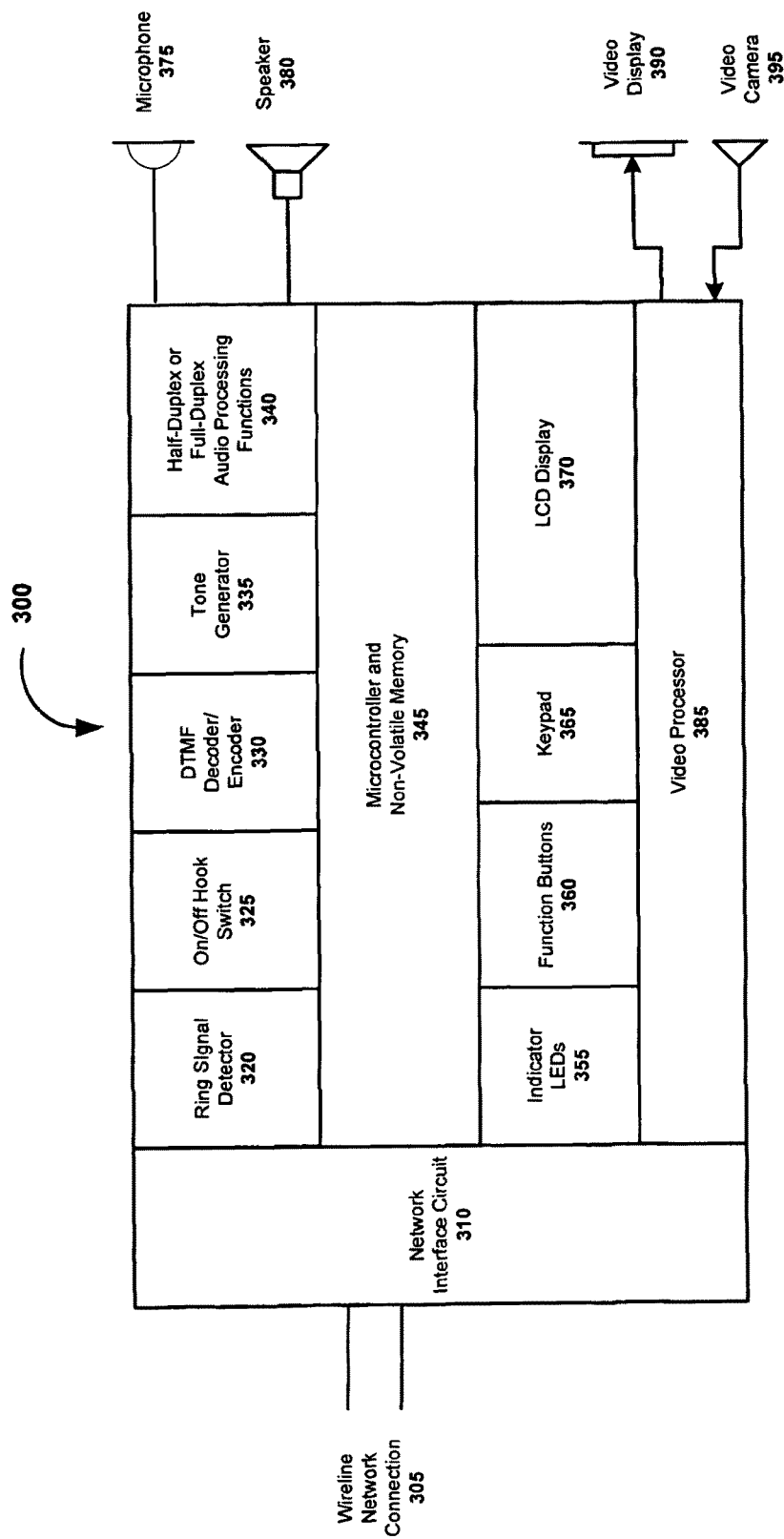
FIG. 3 is a system function diagram of a remotely controlled combination audio and video speakerphone employing a wireline network connection.

FIG. 3 is a system function diagram illustrating an embodiment of a remotely controlled combination audio and video speakerphone 300 that interfaces with a conventional analog or digital wireline network 305. The speakerphone 300 employs a network interface circuit 310 that provides line isolation, signal conditioning, and if necessary, modulation and demodulation or encoding and decoding of the received and transmitted audio and video signals as required by the network protocol. In addition, the network interface circuit 310 includes circuitry to detect busy or other forms of call connection status signals, providing such detection data to the microcontroller. A ring signal or incoming call request message detector 320 monitors incoming signaling to provide the microcontroller 345 with a means to count incoming ring or call request signals. When a specified number of ring signals are detected, the microcontroller 345 sets the hook switch 325 in its off-hook state, in accordance with the requirements of the particular network protocol, to answer the incoming call. When the microcontroller has answered the incoming call, and a two-way connection has been established, the caller is audibly or visually prompted by the microcontroller 345 to begin sending a caller password using DTMF signaling. This prompt is sent only to the caller, and if audible is provided by the tone generator 335 which is enabled for this purpose by the microcontroller 345. A visual prompt may be generated by the microcontroller 345 in conjunction with functions of the video processor 385. Following the prompt to the caller, the incoming password is received and decoded by the DTMF decoder circuit 330, providing the microcontroller 345 with a digital representation of the DTMF signaling. This password sequence may also include control codes that are appended to the password and used to configure the initial operating behavior of the speakerphone. The microcontroller 345 compares and validates the password and control codes against a table of authorized passwords and control codes that have been previously programmed by the speakerphone owner and stored in non-volatile memory 345, accessible to the microcontroller. Once the caller-provided password has been validated, the microcontroller 345 audibly and/or visually notifies the caller of the activation of the speakerphone audio processing functions 340 and video processing functions 385, and depending upon caller defined mode control parameters, may also audibly and/or visually notify the call recipient of the activation of the speakerphone. The audio processing functions 340 and video processing functions 385, may separately operate in either full-duplex or half-duplex mode. Upon activation, certain audio processing functions 340 and certain video processing functions 385, may be caller-controlled; these are determined by the control code that may have been sent appended to the password and by configuration data stored in non-volatile memory. The audio functions may include activation of either or both of the microphone 375, and the speaker 380. The caller's control codes may also determine the operating behavior of the video processing function 385, enabling or disabling either or both of the video display 390 or camera 395. Various indicator lights 355 are provided for the purpose of indicating the operating state of the speakerphone to the call recipient, and the presence of power. The inclusion of a keypad 365, LCD display 370 and function buttons 360 provide a means for a local user to power on the speakerphone, put the speakerphone in a programming mode for storage of authorized caller identities including passwords, control code permissions, pre-stored rapid-dial numbers, and other configuration parameters. Each of multiple speakerphones sharing a common or simultaneous network connection with the caller, such that they would all answer a call, validate the caller password, and activate themselves simultaneously, may be user programmed with unique serial number identities, enabling each unit to be individually addressable by control codes during a call, allowing the caller to selectively change their operating parameters, modes of operation, or to selectively terminate the call to one or more devices that are operating simultaneously on a single call. The function buttons also facilitate the initiation and dialing of outgoing telephone calls in a conventional manner. Once a caller's password is validated, the caller's identity may be retrieved by the microcontroller 345 from non-volatile memory and displayed on the LCD display 370 or video display 390 for the call recipient as textual or visual information, and may be provided in the speaker 380 as a synthesized or pre-stored voice announcement of the caller's identity. After the speakerphone is in operation and a call is underway, the authorized caller can send DTMF control codes that are decoded 330 and provided to the microcontroller 345 for adjustments of operating parameters and changes of the mode of operation. Controllable operating parameters may include speaker volume, microphone gain, and other audio processing parameters, and video processing and display or camera functions. Controllable modes of operation may include one-way or two-way audio or video, and a code used to terminate the call, all without intervention or involvement by the call recipient. When a busy signal, or other form of caller disconnect is detected 310, the microcontroller 345 automatically hangs up the current call and resets the speakerphone in a ready state, available to answer and validate an incoming call.

Figure 4:
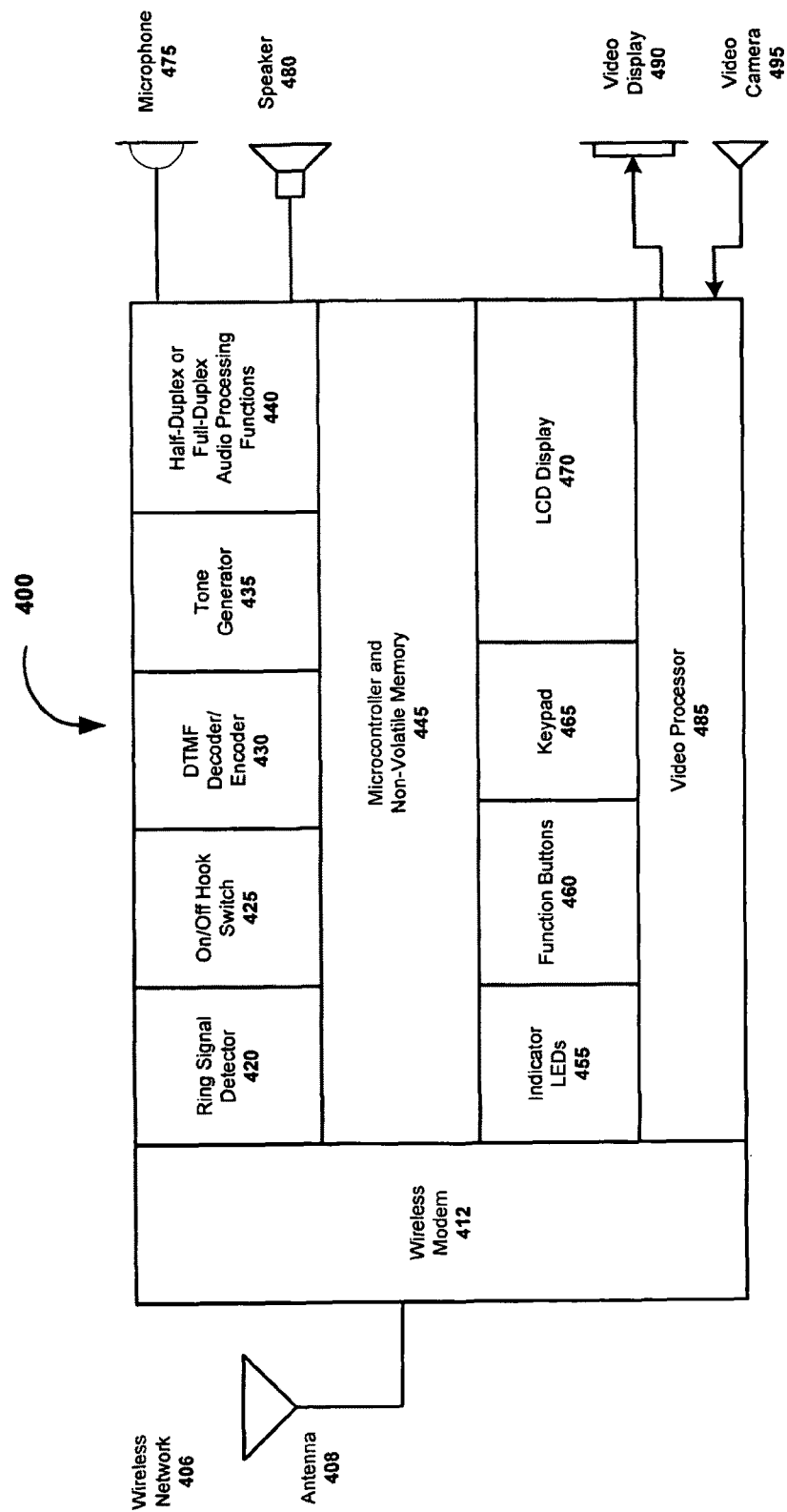
FIG. 4 is a system function diagram of a remotely controlled combination audio and video speakerphone employing a wireless network connection.

FIG. 4 is a system function diagram illustrating an embodiment of a remotely controlled combination audio and video speakerphone 400 that interfaces with a wireless voice and/or data network 406. The speakerphone 400 employs a wireless modem 412 with antenna 408, together providing the speakerphone with a network connection for voice and video calls. In addition, the wireless modem 412 includes circuitry to detect busy or other forms of call disconnect signals, providing such detection data to the microcontroller. A ring signal or incoming call request message detector 420 monitors incoming signaling to provide the microcontroller 445 with a means to count incoming ring or call request signals. When a specified number of ring signals are detected, the microcontroller 445 sets the hook switch 425 in its off-hook state, in accordance with the requirements of the particular network protocol, to answer the incoming call. When the microcontroller has answered the incoming call, and a two-way connection has been established, the caller is audibly or visually prompted by the microcontroller 445 to begin sending a caller password using DTMF signaling. This prompt is sent only to the caller, and if audible is provided by the tone generator 435 which is enabled for this purpose by the microcontroller 445. A visual prompt may be generated by the microcontroller 445 in conjunction with functions of the video processor 485. Following the prompt to the caller, the incoming password is received and decoded by the DTMF decoder circuit 430, providing the microcontroller 445 with a digital representation of the DTMF signaling. This password sequence may also include control codes that are appended to the password and used to configure the initial operating behavior of the speakerphone. The microcontroller 445 compares and validates the password and control codes against a table of authorized passwords and control codes that have been previously programmed by the speakerphone owner and stored in non-volatile memory 445, accessible to the microcontroller. Once the caller-provided password has been validated, the microcontroller 445 audibly and/or visually notifies the caller of the activation of the speakerphone audio processing functions 440 and video processing functions 485, and depending upon caller defined mode control parameters, may also audibly and/or visually notify the call recipient of the activation of the speakerphone. The audio processing functions 440 and video processing functions 485, may separately operate in either full-duplex or half-duplex mode. Upon activation, certain audio processing functions 440 and certain video processing functions 485, may be caller-controlled; these are determined by the control code that may have been sent appended to the password and by configuration data stored in non-volatile memory. The audio functions may include activation of either or both of the microphone 475, and the speaker 480. The caller's control codes may also determine the operating behavior of the video processing function 485, enabling or disabling either or both of the video display 490 or camera 495. Various indicator lights 455 are provided for the purpose of indicating the operating state of the speakerphone to the call recipient, and the presence of power. The inclusion of a keypad 465, LCD display 470 and function buttons 460 provide a means for a local user to power on the speakerphone, put the speakerphone in a programming mode for storage of authorized caller identities including passwords, control code permissions, pre-stored rapid-dial numbers, and other configuration parameters. Each of multiple speakerphones sharing a common or simultaneous network connection with the caller, such that they would all answer a call, validate the caller password, and activate themselves simultaneously, may be user programmed with unique serial number identities, such that they are individually addressable by control codes during a call, enabling the caller to selectively change their operating parameters, modes of operation, or to selectively terminate the call to one or more devices that are operating simultaneously on a single call. The function buttons also facilitate the initiation and dialing of outgoing telephone calls in a conventional manner. Once a caller's password is validated, the caller's identity may be retrieved by the microcontroller 445 from non-volatile memory and displayed on the LCD display 470 or video display 490 for the call recipient as textual or visual information, and may be provided in the speaker 480 as a synthesized or pre-stored voice announcement of the caller's identity. After the speakerphone is in operation and a call is underway, the authorized caller can send DTMF control codes that are decoded 430 and provided to the microcontroller 445 for adjustments of operating parameters and changes of the mode of operation. Controllable operating parameters may include speaker volume, microphone gain, and other audio processing parameters, and video processing and display or camera functions. Controllable modes of operation may include one-way or two-way audio or video, and a code used to terminate the call, all without intervention or involvement by the call recipient. When a busy signal, or other form of caller disconnect is detected 412, the microcontroller 445 automatically hangs up the current call and resets the speakerphone in a ready state, available to answer and validate an incoming call.

Figure 5A:
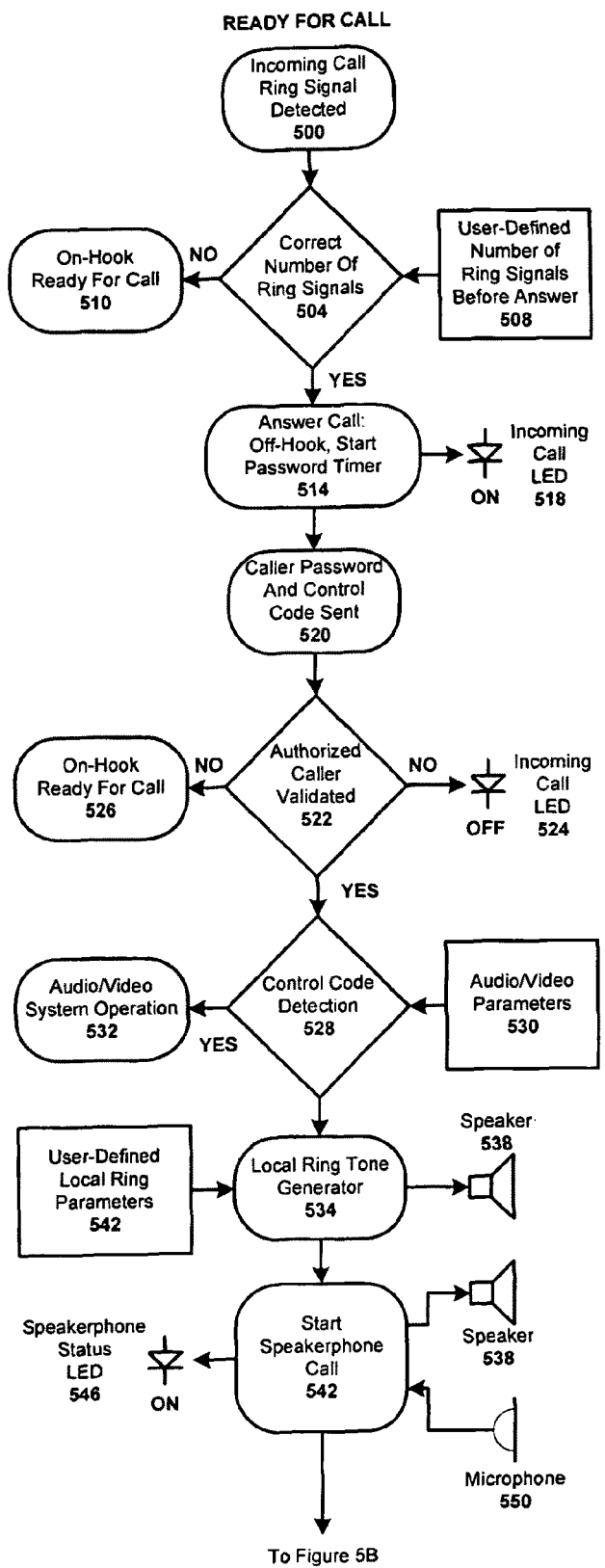
FIGS. 5A and 5B are first and second flowcharts of a method for receiving a call in a remotely controlled speakerphone.
Figure 5B:
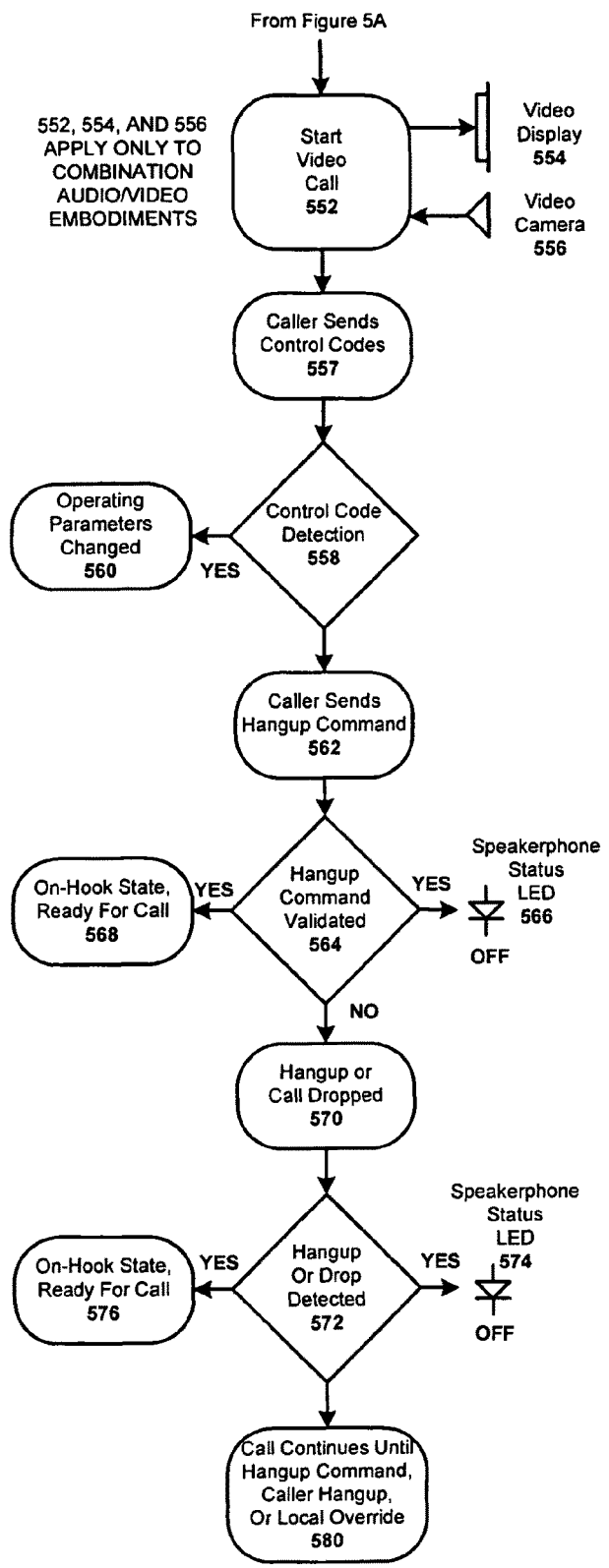

FIGS. 5A and 5B are a software function flowchart illustrating various automatic and caller-initiated speakerphone control functions performed by the embedded control software. This software function description is included to augment the detailed descriptions above of FIGS. 1, 2, 3, and 4, and describes embodiments used with analog or digital wireline or wireless networks, and that support audio-only and combination audio and video one-way and two-way communications. The function flowchart begins with the speakerphone in its on-hook state 500, ready to detect the presence of one or more incoming ring tones, ring signals, or call request messages. The ring signal counter 504, compares its count of detected ring tones or signals 500 with a pre-stored number that the user has defined 508. If the user-defined number of ring signals necessary before answer is greater than one, the ring signal counter 504 resets its count to zero if more than a designated period of time elapses between a first detected ring signal and the end of the designated time period, if the desired count has not been detected. When the designated number of incoming ring signals have been detected 504, the call is answered 514 without audible notification of the call recipient, illuminating an incoming call indicator lamp 518, and starting a counter that provides the caller with a fixed length of time during which to enter a password and optional control code 520 using caller-initiated DTMF tone signaling from any conventional wireline or wireless telephone device or from a functional equivalent implemented in software on a computer. Upon answering the call 514, the speakerphone sends the caller an audible signal, as a prompt for the entry of a password and optional control code sequence. If during this password and control code timer period, an authorized password is not received, the password detection timer resets itself, the incoming call indicator lamp is turned off 524, and the speakerphone is returned to its on-hook ready state 526. Following validation of an authorized caller's password 522, and the detection of control codes 528 that may be included with the password, the speakerphone operating mode parameters that are associated with the detected password and/or the control codes are implemented by the software. Examples of functions controlled by operating parameters may include pre-setting the speaker volume level, enabling or disabling local audible notification of the call recipient, or enabling or disabling the speaker, microphone, video display, or camera, or enabling or disabling the caller's ability to remotely control some or all user-defined parameters. Following validation of an authorized password 522, depending on the operating mode defined by a caller-provided control code 528, or in pre-stored configuration data 530, the call recipient may be audibly and visually notified of the presence of an authorized call, followed by the activation of the speakerphone audio functions 542, and/or video functions 552, according to pre-stored definitions of such notification 542. Audible notifications are accomplished by activating local tone or synthesized voice generation 534, which uses the device's speaker 538. Upon activation of the speakerphone audio 542 and/or video 552, one or more of: the speaker 538, microphone 550, video display 554, and video camera 556, may be employed for the call. During a call, following speakerphone activation, the software continuously monitors for the receipt of caller-initiated control codes sent using DTMF signaling 557; this monitoring function 558 is accomplished using the same DTMF signaling detection hardware employed for password and control code detection 522 and 528. If control codes are detected, the operating parameters and operating modes of different functions are modified 560 under software control, in accordance with pre-stored caller-specific control permissions. An example of such a remotely controlled operating parameter modification is an increase or decrease in speaker volume level, or an increase or decrease in microphone gain. If the caller sends a special control code for call hangup or termination 562, this code is validated and the speakerphone is returned to the on-hook state, ready for an incoming call 568. Upon validation of the hangup code, the Speakerphone status indicator light is turned off 566. If the caller hangs up or is disconnected 570, without having sent a recognized hangup command, the software receives this status from the call status detection hardware 572, and returns the speakerphone to the on-hook state, ready for an incoming call 568. Upon entering the on-hook state, the Speakerphone status indicator light is turned off 574. In the absence of a hangup command or the detection of a call hangup or dropped call, the speakerphone continues in the activated state 580 unless the call is terminated by a local manual override, for example by the call recipient pushing the speakerphone enable/disable button. Each of multiple speakerphones sharing a common or simultaneous network connection with the caller, and that have been individually configured to answer a call on the same number of ring signals, would concurrently validate the caller password, and activate themselves, and may be user programmed in advance with unique serial number identities that are stored in non-volatile memory, such that they are individually addressable by control codes during a call, enabling the caller to selectively change their operating parameters, modes of operation, or to selectively terminate the call to one or more devices that are operating simultaneously on a single call.

Figure 6A:
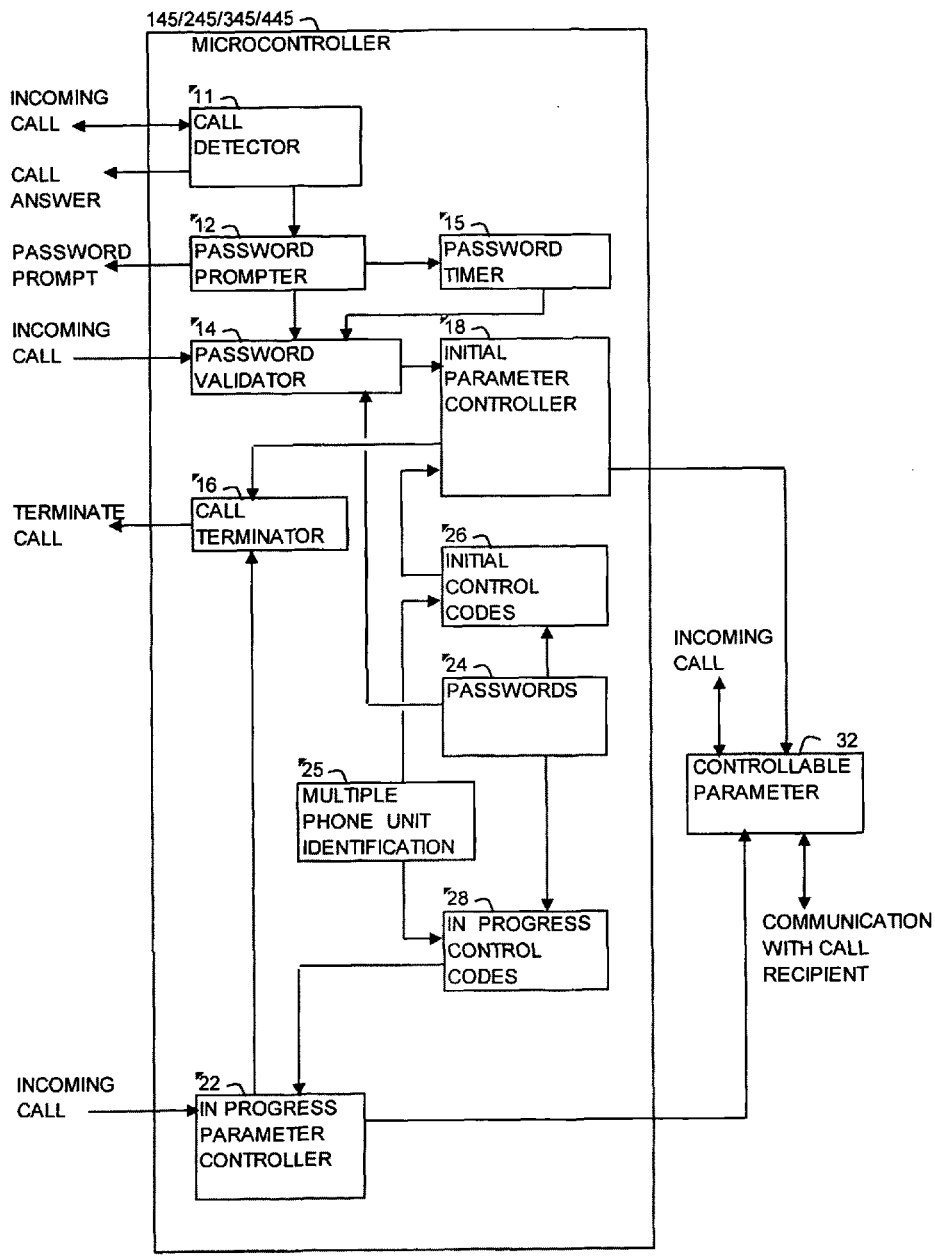
FIG. 6A is a function block diagram for the microcontroller described in FIGS. 1-5.

FIG. 6A is a block diagram for the phone functions of the microcontroller 145,245,345,445 that are described in FIGS. 1-5 for the phone 100,200,300,400. The microcontroller includes a call detector 11, a password prompter 12, a password validator 14, a password timer 15, a call terminator 16, an initialization control processor 18, an in-progress control processor 22, passwords 24, a multiple phone identification 25, initial control codes 26, and in-progress control codes 28. The phone provides one-way or two-way communication between an authorized caller and a call recipient in an audio and/or video form. The communication is "in-progress" when the validated caller is connected with any or all of the audio and/or video functions of the phone and the caller's communications are perceivable to or from a call recipient whether or not the call recipient is actively participating. A control code is one or more of a pre-defined set of DTMF signals or voice commands recognized by the microcontroller which an authorized caller has pre-defined permission to use to set, adjust or change controllable parameters 32 of phone functions without active participation or intervention of the call recipient. The parameters 32 may be grouped together to form modes.

The call detector 11, answers an incoming call upon detection of a designated number of ring signals or call initiation request signals. The password prompter 12 is connected to the call detector 11 to respond to an incoming call by requesting a password from the caller. The request may be transmitted in an audio form directly through the network interface circuit or wireless modem 110,212,310,412 or through the tone generator 135,235,335,435. The password prompter 12 triggers the password timer 15 to start a time receipt of a valid password and triggers the password validator 14 to monitor the incoming call for a valid password. The password validator 14 may be constructed to monitor the incoming call through the DTMF decoder/encoder 130,230,330,430 for a touch-tone password response from the caller, or directly through the network interface circuit or wireless modem. The passwords 24 are a list of authorized valid passwords. The passwords 24 are manually entered into non-volatile memory in the phone at the phone. After the password prompter 12 requests the password, the password validator 14 compares data or voice in the incoming call to the passwords 24. When the password validator 14 recognizes a valid password, it communicates with initialization control processor 18 to continue the incoming call and to control the parameters 32 of the phone that are associated with that password. If the elapsed time from the password timer 15 reaches the timeout before a valid password is recognized, the password validator 14 communicates with the call terminator 16 to terminate the incoming call through the on/off hook switch 125,225,335,435. The multiple phone identification 25 is optional to identify a particular phone unit to have particular set of control codes 26 and 28 that are authorized for that phone unit for a particular set of parameters 32 separately for each phone unit when multiple phone units share a common or simultaneous network connection with the caller, thereby allowing control of units individually by serial number or collectively as a group.

The initial control codes 26 are a list of authorized control codes that may be appended to the caller's password to initialize the parameters 32 of the phone without intervention by the call recipient, in some cases before the intended call recipient is even made aware of an incoming call. The authorized initial control codes 26 are manually entered locally into the phone at the phone, and are stored in non-volatile memory. The list of initial control codes 26 may be different for each password and for each of multiple phone units. The initialization control processor 18 communicates with the password validator 14 and the multiple phone identification 25 to control phone functions and set the phone parameters 32 according to preconfigured settings associated with the incoming call password and the particular phone. The initialization control processor 18 detects control code characters appended to the password in the incoming call and compares the control code characters to the initialization control codes 26. When the initialization control processor 18 recognizes an authorized control code appended to the password, it operates to control the parameters 32 of the phone function that are associated with that control code. When a valid password has been observed and the phone function parameters associated with the initial control codes 26, if any, have been implemented, the incoming call is continued and one or two-way audio and/or visual communication is enabled and the incoming call is considered in-progress.

The in-progress control codes 28 are a list of authorized control codes that may be transmitted at any time in the incoming call while communication is in-progress. This list is manually entered into the phone at the phone, and are stored in non-volatile memory. The authorized in-progress control codes 28 may be different for each password and for each of multiple phones and may be different than the initial control codes 26. The in-progress control processor 22 monitors the incoming call through the DTMF decoder/encoder for a touch-tone control code from the caller, or directly through the network interface circuit or wireless modem to detect authorized in-progress control codes 28 in the incoming call. When the in-progress control processor 22 recognizes one of the authorized control codes 28, it operates to control the parameter 32 of the phone function that is associated with that control code. Examples of initialization and in-progress control codes are codes to adjust speaker volume or microphone sensitivity, or to switch the on/off hook switch 125,225,325, 425 to the on-hook state to terminate the incoming call.

The microcontroller 145,245,345,445 uses the control codes received from an authorized caller to control the hardware and software of the phone 100,200,300,400 to control the variable parameters 32 of the phone that effect the audio or visual communication that is perceivable by a human call recipient. The following list shows some of the parameters 32 that are associated with passwords 24, control codes 26 and 28, and optional unit IDs 25, and controlled by control codes that are received from an authorized caller.

parameters

Call connection to connect or terminate incoming call with an on/off hook switch.

Speaker sound system on or off.

Speaker sound volume up or down.

Microphone sound system sensitivity (gain) increase or decrease.

Silent monitor mode to enable the microphone sound system with the speaker sound system disabled or muted.

No announce mode to enable the microphone sound system and enable the speaker sound system without giving audible notice or ringing to the call recipient when an incoming call is connected.

Camera system to enable or disable a camera for video or still pictures.

Video display to enable or disable the display of a picture, text, or video transmitted from the caller.

Figure 6B:
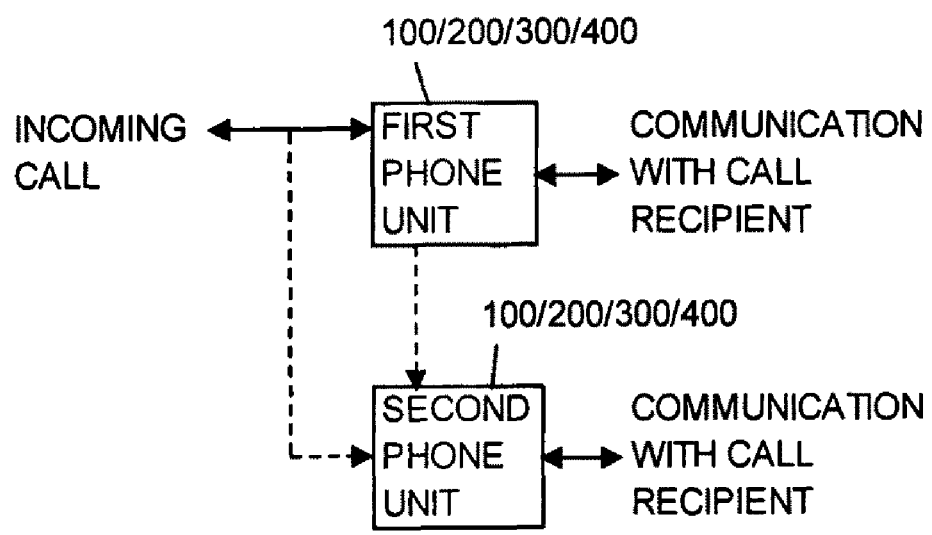
FIG. 6B is a function block diagram showing multiple phone devices for the phones described in FIGS. 1-5.

FIG. 6B is a block diagram showing multiple (first and second) phone units for the phone 100,200,300,400 described in FIGS. 1-5. The units can be constructed so that each unit connects into the telephone network to receive the incoming call. Or the first unit may connect into the telephone network and pass the incoming call to the second and additional units through a local wired or wireless connection. The password may be authenticated in each unit independently, or the first unit may authenticate the password and then pass authenticated incoming calls to the second and additional units.

Figure 6C:
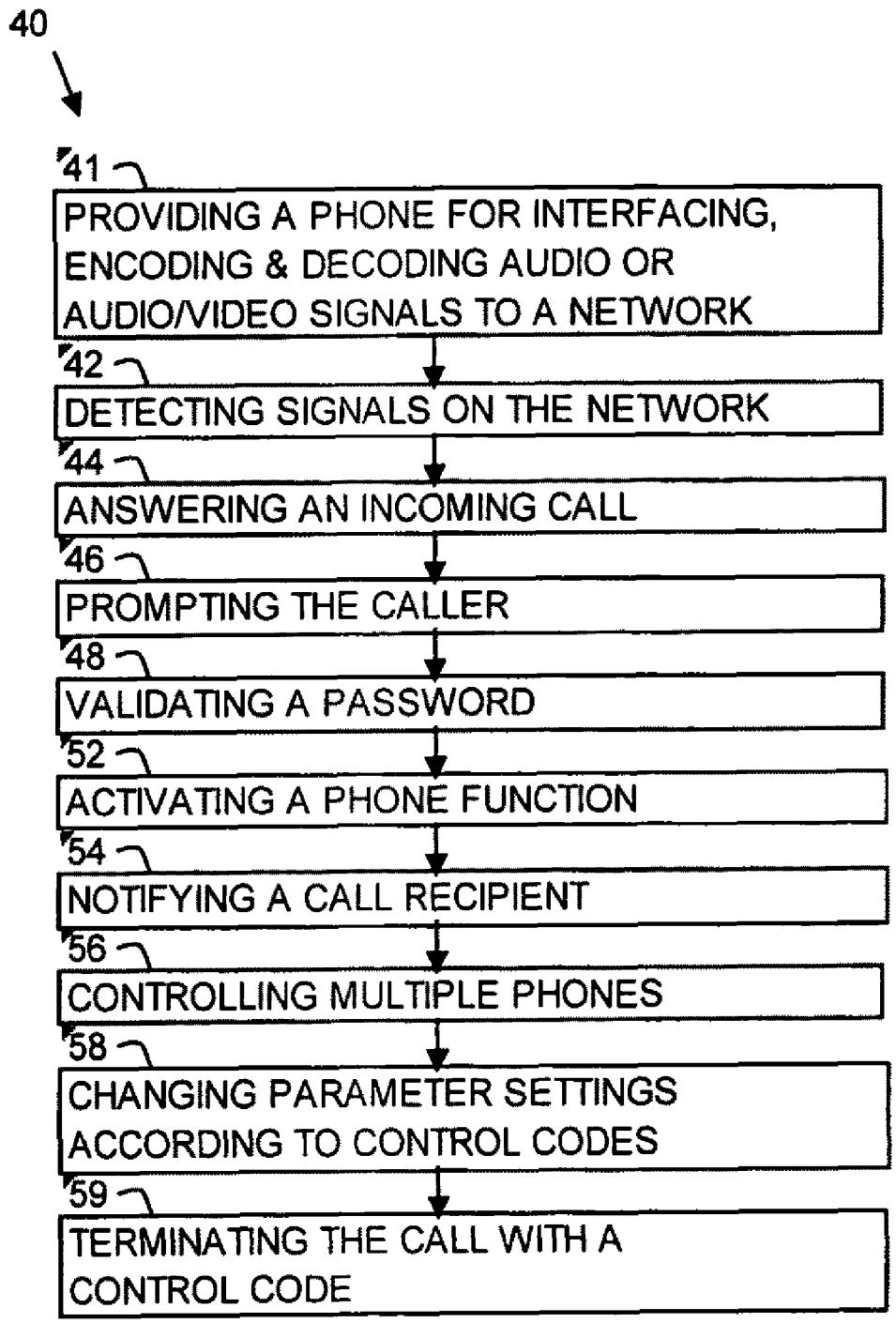
FIG. 6C is a first function flow chart for the microcontroller described in FIGS. 1-5.

FIG. 6C is a flow chart of a method for performing automatic activation of audio or combined audio/video communications functions, in response to a caller providing an authorized password communicated using DTMF signaling, or other methods, and enabling an authorized caller to remotely control a speakerphone operating parameters and mode during a call. The steps of the method may be embodied in a tangible medium 40 in the form of computer-readable instructions that can be read by a computer for carrying out the steps. The tangible medium 40 may include a non-volatile electrical, magnetic or optical memory. A step 41 includes providing a phone and interfacing the phone to an analog or digital wireline or wireless communications network, including signal conditioning and modulation and demodulation or encoding and decoding of incoming audio or combined audio/video signals. A step 42 is detecting signals from the network for ring tones, call initiation requests, DTMF signaling, dial tone, busy, fast-busy, or other call connection status signals. A step 44 is answering an incoming call upon detection of a designated number of ring signals or call initiation request signals. A step 46 is prompting a caller for a password which may include a control code. A step 48 is validating that the password matches an internally stored authorized password. A step 52 is activating an audio and/or video transmit and receive function based on the control code and pre-stored configuration data. A step 54 is notifying a call recipient of activation. A step 56 is controlling multiple speakerphones sharing the communication network with the caller, allowing control of individual speakerphones by serial number or collectively as a group. A step 58 is changing operating parameters or mode according to control codes, and enabling the authorized caller to terminate the call. And a step 59 is hanging up or terminating the call if the caller has been disconnected for any reason, and that responds to authorized caller-transmitted control codes sent during a call that enable an authorized caller.

Figure 6D:
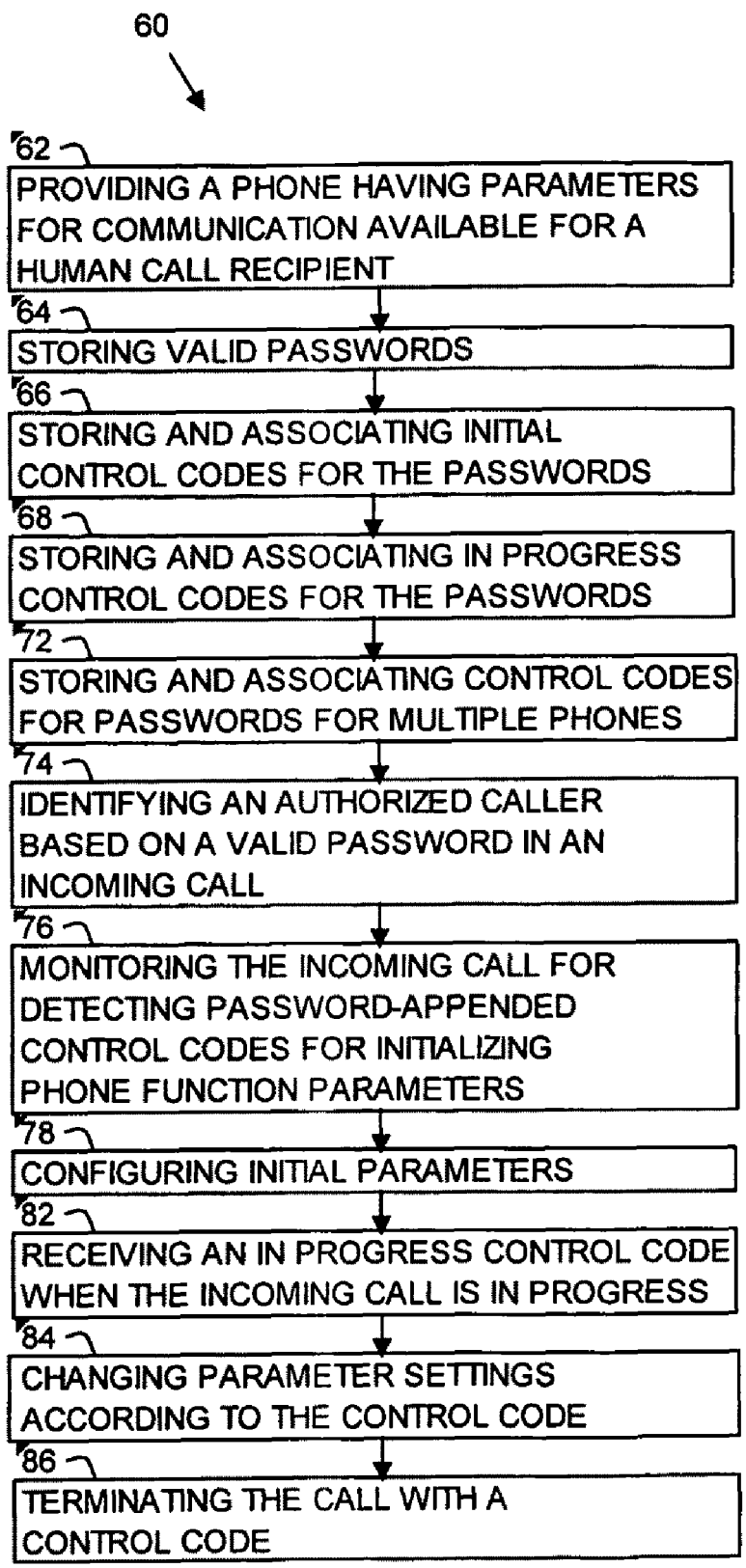
FIG. 6D is a second function flow chart for the microcontroller described in FIGS. 1-5.

FIG. 6D is a flow chart of a method using a phone for audio or visual communication between an authorized caller and a call recipient. The steps of the method may be embodied in a tangible medium 60 in the form of computer-readable instructions to be read by a computer for carrying out the steps. The tangible medium 60 may include a non-volatile electrical, magnetic or optical memory. A step 62 is providing a phone having parameters for the communication between an authorized caller and a call recipient. The communication may be one-way or two-way. The call recipient may or may not actively participate in the communication, may or not intervene in any way with the communication and may or may not be made aware of the communication. A step 64 is storing valid passwords that identify authorized callers. There may be one or more authorized callers. A step 66 is storing initialization control codes that are associated with the authorized callers according to their passwords. A step 68 is storing in-progress control codes that are associated with the authorized caller according to their passwords A step 72 is storing control codes for multiple phones according to the passwords and phone ID's. A step 74 is receiving an incoming call and identifying an authorized caller by detecting a valid password. A step 76 is monitoring the incoming call and detecting initialization control codes appended to the valid password for initializing parameters of phone communication functions. A step 78 is initially configuring parameters of phone functions for preset configurations and initialization control codes that are received in the incoming call. A step 82 is monitoring and receiving in-progress control codes while one-way or two-way communication is in-progress between the authorized call and the call recipient. A step 84 is changing a setting of a parameter according to the control code. And a step 86 is hanging up or terminating the call if the caller has been disconnected for any reason, and that responds to authorized caller-transmitted control codes sent during a call that enable an authorized caller.

Figure 7:
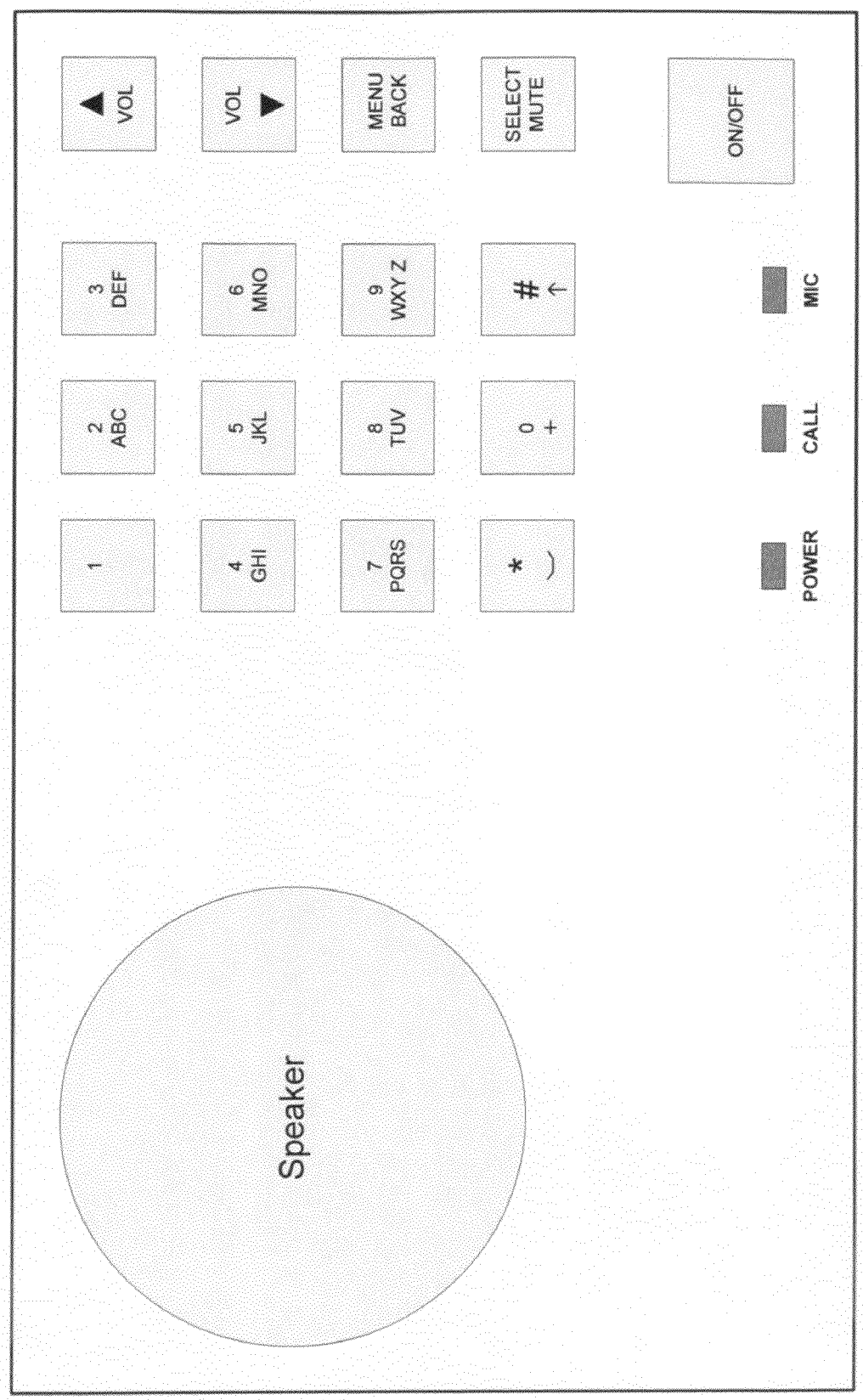
FIG. 7 is a front panel of a phone for the FIGS. 1-6.

FIG. 7 is a front panel that may be used with the phone 100,200,300,400.

Embedded software functions and parameters of the phone 100,200,300,400 are described below.

Embedded Software Functions

Caller Validation

An incoming ring signal is detected by ring signal detector (counts as the first ring)

Ring signal timer started (adequate time for the designated number of rings, approximately five-seconds)

Ring signals are counted before timer resets

If RINGER=ON [default=OFF] then enable speakerphone upon detection of first ring signal, otherwise, speakerphone remains off during caller validation At the pre-specified ring signal count (default=three, configurable at one, three, and five rings) the microcontroller sets the line interface in the OFF-HOOK state (connecting the call)

CALL LED=RED (visually notifying recipient that a caller is being validated)

MIC LED=RED (visually indicating unit OFF-HOOK with MIC disabled/muted)

The tone generator generates a one-second audible beep indicating to the caller the unit is waiting for a password and control code A password authentication timer starts (nominally five seconds)

The DTMF detector is enabled

LCD backlight=ON

LCD first line=CALLER ID CHECK

LCD second line=blank

The sequence of the first four (as an example) incoming DTMF tones are compared with the pre-stored authorized caller password list. If an authorized password is detected, an optional control code is compared with those allowed for the password that has been received. If more than password plus one-digits are received from a caller, then the caller is considered unauthorized.

After the unit has detected the specified number of ring signals and has gone OFF-HOOK the microprocessor periodically monitors call progress for dropped calls or hang-ups (example: fast busy or dial tone), so that the unit can be returned to the ON-HOOK state, ready for a next call.

Authorized Password not Received

If an authorized DTMF password is not received (during the password authentication timer), or if a 'good' password is received but the additional control code digit is either not a defined control code or not allowed for that caller, or if more than password plus one-digits are received, then the unit goes back to the ON-HOOK 'ready' state.

Subsequently the BAD CALLER Counter is incremented by one [the function of this is to block automated calling robots]

CALL LED=OFF

MIC LED=OFF

LCD 1$^{st}$ line=READY

Start BAD CALLER Timer=sixty-seconds.

If two more BAD CALLS are received during BAD CALLER Timer, then ignore all incoming ring signals for a period of LOCKOUT during which a timer counts to sixty-seconds.

During the LOCKOUT timer, the LCD backlight is turned on, and the first line displays "WAIT LOCKOUT" (the second line of the display is blank)

After the LOCKOUT timer resets, LCD backlight=OFF

Reset LCD 1$^{st}$ line to READY

Reset all functions to the READY state

Correct Password and Valid Optional Control Code are Received

If a correct DTMF password and a legitimate control code have both been received (during the Password Authentication Timer) the absence of a control code digit is legitimate for any authorized caller.

When a caller identity and password are programmed into the unit's non-volatile memory, callers may be assigned one of three different Access Levels:

(1) no control code access (same as control code=none), (2) control codes none, 0 only, or (3) none, 0, 1

Any time the LCD is displaying anything except READY, the backlight=ON

During an authorized call, under control codes=none, 0, or 1, the LCD 1st line displays the stored caller name (i.e.: CALLER-1, JOHN SMITH, or EMERGENCY)

Control Code=None [no control code] [Normal Announced Operation]

Speakerphone enabled in full-duplex (mic+spkr); volume and mic gain per last used levels.

CALL LED=GRN

MIC LED=GRN

Long single-tone double beep in phone speaker and also transmitted to caller

Playback of digitally stored voice announce of caller identity [either factory default voice or user voice]

LCD second line="MIC OFF=SELECT" [if muted then display "MIC ON=SELECT"]

Control Code=0 [Silent Monitoring Mode]

Speakerphone mic only is enabled, speaker disabled/muted

MIC LED=GRN

CALL LED=RED [indicating mic only]

Fast single-tone double beep heard only by caller

LCD second line="MIC ONLY"

Control Code=1 [No Announce, Speakerphone Enabled Mode]

Fast single-tone triple beep heard only by caller

Speakerphone enabled in full-duplex (mic+spkr)

MIC LED=GRN

CALL LED=GRN

Control Code=* [Remote Programming Mode]

Reserved for use with factory backdoor password only (EMERGENCY pwd)

Remotely control keypad and view LCD

Speaker and Mic both disabled

CALL LED=GRN

MIC LED=RED

Unit and local LCD in programming mode

General Actions after Caller Validation is Successful

During any call-in-progress, after validating a password and control codes, the DTMF tone detector monitors for DTMF control codes.

The line interface monitors Call Progress tones for a dropped call. There are multiple different tones that are detected by the line interface that can indicate a dropped call.

If a dropped call (fast busy or dial tone) is detected, then the unit goes ON-HOOK and resets itself waiting for an incoming ring signal. Then CALL LED=OFF, MIC LED=OFF DTMF 'Control' Tones Sent by Caller During A Validated Call
  May be sent by any password-authorized user [all control code authorization levels]
  The role of the DTMF detector during a call is to monitor for incoming DTMF tones.
    After password validation, if the speaker is enabled, as soon as the DTMF detector recognizes a valid incoming DTMF control tone the speaker should be muted abruptly (so that the call recipient does not hear the incoming DTMF tone).
List of Control Tones During a Call:
  HANG UP=#
  ENABLE SPEAKER=* [switches from control code 0 to none, spkr on]
  VOLUME UP=3 [increase speaker volume one pre-defined step size]
  VOLUME DOWN=9 [decrease volume one pre-defined step size]
  MIC GAIN INCREASE=1 [increase mic gain one pre-defined step size]
  MIC GAIN DECREASE=7 [decrease mic gain one pre-defined step size]
Caller Sends Hang-Up Code
  HANG UP CODE=#
  If the user presses the ON/OFF-HOOK key during any call, the action is the same as receipt of the hang up code (#)
  If spkr was on, DTMF tone generator (single-tone mode) generates fast triple beep in spkr
    If speaker was muted, it stays muted
  Speakerphone disabled
  MIC LED=OFF
  CALL LED=OFF
  LCD backlight=OFF
  Phone returns to On-Hook ready state
Caller Sends 'Enable Speaker' Code
  ENABLE SPEAKER=*
  Speakerphone enabled in full-duplex (mic+spkr); volume and mic gain per last used levels.
    CALL LED=GRN
    MIC LED=GRN
  Long single-tone double beep in speaker and also heard by caller
  Synth. Voice announce of caller name [either factory default voice or user voice]
  LCD second line="MIC OFF=SELECT" [if muted then display "MIC ON=SELECT"]
Caller Sends Volume Adjust Code (Separate UP And DOWN Codes)
  VOLUME ADJUST UP CODE=3
  VOLUME ADJUST DOWN CODE=9
  Speaker muted during tones
  Volume adjusted in fixed steps per each VOL UP/DN keypress received
  Step size same as front panel UP/DN keys
Call Drops or Caller Hangs Up
  Line interface Call progress monitors for fast busy or dial tone while the unit is Off-Hook
  The unit returns to an On-Hook state, ready for the next call
Programming the Unit via Keypad
  MENU button enters programming mode [see keypad button layout]
    Unit must be ON-HOOK before MENU can be entered
      Message: HANG UP FIRST (if not ON-HOOK when MENU pressed)
    Speaker enabled when MENU button has been pressed, so that the MENU keypress and all subsequent keypresses produce an audible tone generated by the DTMF generator in single-tone mode for presses of the function keys, or the actual DTMF tones from the 1-# dialing keys.
Menu navigation paradigm
  VOL UP/DN scrolls through list of menu items
  12-key keypad changes menu item value
  SELECT selects the branch of the menu hierarchy (at top) and \stores the new value
  MENU key=back or exit menu
  Alphabetical inputs
    The "*" key toggles between alpha/numeric
      Delay for each character for toggle through ABC choices (use the MENU/BACK key for backspace function)
    All upper case
  LCD top line=Menu entry label and prompt (see examples below)
  LCD second line=current entry value (except for voice announce)
  MENU ITEMS
Menu Functions
<<Note: phone numbers need to allow up to 13-digits including the following three characters each in parentheses (*) (#) (,) for PBX control>>
  List of Top Level Menu Items as shipped:
  EMERGENCY—a special CALLER record for emergency contact
  CALLER-1—a first CALLER record, with password, ready to edit or use as-is
  ADD CALLER—a menu item for creation of a second CALLER record
  NUMBER OF RINGS—the number of rings before auto answer & password validate
  RINGER—allows mode for local user to hear ring tones before caller validation
  MASTER/SLAVE—allows automatic wireless control of SLAVE units sharing the same caller connection
  REMOTE CONTROL—allows use of a hand-held or pendant remote control
  SPEAKER VOLUME—sets default volume level
Dialing Out Using Keypad
  User presses ON/OFF HOOK button
  Speakerphone enabled so that an audible tone (same as for programming via keypad, above) is heard in the speaker.
  OFF-HOOK state
  LCD=blank; backlight=ONCALL LED=GRN
  Detect dial tone, else display NO DIAL TONE. If no dial tone, then start 10-sec timer and set unit ON-HOOK.
  If dial tone, then as user presses keys, send DTMF dialing tones outbound
    User hears outbound DTMF tones in speaker
  After call ends (for any reason) CALL LED=OFF
Dialing Out Using Speed Dial for Pre-Stored Numbers
  User presses numbers (1-0 only) on keypad for longer than 1-second
    0=EMERGENCY number
    1=CALLER-1, 2=CALLER-2, etc.
  Speakerphone enabled, unit goes OFF-HOOK, dials the pre-stored number in DTMF, user hears the outgoing DTMF tones.
  Dropped call detector working, hangs up as during a call.
  LCD backlight=ON
  CALL LED=GRN
  CALLER name displayed on LCD $1^{st}$ line
    LCD displays number dialed on $2^{nd}$ line
  After call ends (for any reason) CALL LED=OFF In view of the above detailed descriptions and associated drawings, other modifications and variations will now become apparent to those skilled in the art. It should also be apparent that such other modifications may be effected without departing from the spirit and scope of the application.

What is claimed is:

1. A speakerphone for use by a call recipient that performs automatic activation of its audio or video or combined audio/video communications functions without intervention by said call recipient in response to a caller providing an authorized password communicated using DTMF signaling from any communications device capable of said DTMF signaling, and the ability for the authorized caller to remotely control the speakerphone operating parameters or mode during a call, using DTMF signaling, without intervention by the call recipient, comprising:

circuitry that interfaces the speakerphone to an analog or digital wireline or wireless communications network, including signal conditioning and modulation and demodulation or encoding and decoding of incoming signaling, and audio or video or combined audio/video signals;

signaling detection circuitry that detects ring tones, or other call initiation requests, DTMF signaling, dial tone, or busy, or fast-busy, or other call connection status signals, and is interconnected with the microcontroller so that said detected signals are available to the embedded control software;

a main microcontroller with attached or embedded memory;

an internally stored list of authorized passwords, configuration data, and control codes;

embedded control software running on the main microcontroller that: answers an incoming call upon detection of a designated number of ring signals or call initiation request signals, and requires, and optionally prompts the caller for, a password which may include an optionally appended control code, and validates that the password matches an internally stored authorized password, and activates some or all of the audio or video or combined audio/video transmit or receive functions based on the password and optionally appended control code and pre-stored configuration data, visually or audibly notifying the call recipient of the automatic device activation;

embedded control software running on the main microcontroller that: automatically hangs up or terminates a call if the caller has been disconnected for any reason, and that responds to authorized caller-transmitted control codes optionally sent during a call that enable the caller to change one or more operating parameters or mode, or enabling the caller to terminate the call;

if multiple speakerphones are sharing a common or simultaneous network connection with the caller, embedded control software running on the main microcontroller that provides the caller with control of said multiple units individually or collectively as a group; and circuitry interconnected with the microcontroller that enables the embedded control software to answer an incoming call and end a call.

2. A method for performing automatic activation of audio or video or combined audio/video communications functions on behalf of a call recipient without intervention by said call recipient, in response to a caller providing an authorized password communicated using DTMF signaling from any communications device capable of said DTMF signaling, and enabling an authorized caller to remotely control, using DTMF signaling, audio or video or combined audio/video communications operating parameters or mode during a call, without intervention by said call recipient, comprising:

an internally stored list of authorized passwords, configuration data, and control codes;

interfacing to an analog or digital wireline or wireless communications network, including signal conditioning and modulation and demodulation or encoding and decoding of incoming signaling, and audio or video or combined audio/video signals;

detecting signals from said network for ring tones, or other call initiation requests, DTMF signaling, dial tone, or busy, or fast-busy, or other call connection status signals;

answering an incoming call upon detection of a designated number of ring signals or call initiation request signals; requiring, and optionally prompting a caller for, a password which may include an optionally appended control code; and validating that the password matches an internally stored authorized password;

activating an audio or video or combined audio/video transmit or receive function based on said password, and optionally appended control code, and pre-stored configuration data; and visually or audibly notifying a call recipient of activation;

hanging up or terminating the call if the caller has been disconnected for any reason, and that responds to authorized caller-transmitted control codes optionally sent during a call that enable an authorized caller to change one or more operating parameters or mode, or enabling the authorized caller to terminate the call;

if multiple said communications devices are sharing a common or simultaneous communication network connection with the caller, allowing control of said multiple devices individually or collectively as a group; and automatically answering the incoming call and automatically ending the incoming call.

3. A phone or other device capable of audio or video or combined audio/video communication for a human call recipient, comprising:

one or more controllable parameters of said communication with said phone or device, said parameters associated with control codes transmitted by the caller using DTMF signaling from any communications device capable of said DTMF signaling;

a microcontroller to associate at least one of said control codes with a password; and the microcontroller is configured to automatically answer and authorize an incoming call by validating said password against an internally stored list of passwords, and if authorized, enabling said communication without intervention by said call recipient; monitor said password-authorized incoming call to detect said control code optionally appended to said password or optionally sent at other times during the call, and control said parameter according to said control code without intervention by said call recipient; hang up or terminate the call if the caller is not authorized or if the caller has been disconnected for any reason, or respond to an authorized caller control code enabling the authorized caller to terminate the call, and automatically end the call.

4. The phone or device of claim 3, wherein:

the phone is configured by the microcontroller according to said control code for a pre-defined permission associated with said password to enable an authorized caller identified with said password to control said parameter automatically without intervention by said call recipient when said password is received in said authorized incoming call.

5. The phone or device of claim 3, further comprising:
a speaker and a microphone; wherein:
said parameters provide a silent monitor mode to enable the microphone and disable the speaker, whereby an authorized caller can receive audio communication from the call recipient but the call recipient can not receive audio communication from the authorized caller.

6. The phone or device of claim 3, further comprising:
a speaker and a microphone; wherein:
said parameters provide a no announce mode to enable the microphone and the speaker without audible notice to the call recipient that said incoming call is connected.

7. The phone or device of claim 3, further comprising:
a camera; and
said parameter activates the camera to take a picture in the vicinity of the phone.

8. The phone or device of claim 3, wherein:
the microcontroller is configured to detect said control code appended to said password to set initial conditions of said parameter for said communication.

9. The phone or device of claim 3, wherein:
the microcontroller is configured to detect said control code to change said parameter while said incoming call is in-progress an arbitrary time after said incoming call was authorized.

10. The phone or device of claim 3, wherein:
the phone includes first and second units having first and second sets of said parameters, respectively, associated with first and second sets said control codes, respectively, associated with the same said password; and
the first and second units are configured to monitor said password-authorized incoming call for said first and second control codes; and control said first and second parameters independently according to said first and second control codes without intervention by said call recipient.

11. A method for audio or video or combined audio/video communication for a human call recipient, comprising steps of:
associating one or more parameters of said communication with control codes transmitted by the caller using DTMF signaling from any communications device capable of said DTMF signaling;
associating at least one of said control codes with a password;
authorizing an incoming call with said password by automatically answering said call, and validating the password against an internally stored list of passwords, and if authorized, enabling said communication without intervention by said call recipient;
monitoring said password-authorized incoming call for detecting said control code optionally appended to said password or optionally sent during the call at other times; and
controlling said parameter according to said control code without intervention by said call recipient;
hanging up or terminating the call if the caller is not authorized or if the caller has been disconnected for any reason, or responding to an optional authorized caller control code enabling the authorized caller to terminate the call, and automatically end the call.

12. The method of claim 11, wherein:
storing said control code includes configuring a phone according to said control code for a pre-defined permission associated with said password to enable an authorized caller identified with said password to control said parameter automatically without intervention by said call recipient when said password is received in said authorized incoming call.

13. The method of claim 11, wherein:
said parameters provide a silent monitor mode for enabling a microphone and muting a speaker, whereby an authorized caller can receive audio communication from said call recipient but the call recipient can not receive audio communication from the authorized caller.

14. The method of claim 11, wherein:
said parameters provide a no announce mode for enabling a microphone and a speaker without audible notice to the call recipient that said incoming call is connected.

15. The method of claim 11, wherein:
said parameters activate a camera for taking a picture in the vicinity of a phone.

16. The method of claim 11, wherein:
monitoring said incoming call includes detecting when said password is appended by said control code for controlling said parameters for setting initial conditions of said parameter for said communication.

17. The method of claim 11, wherein:
monitoring said incoming call includes detecting said control code for changing said parameter while said incoming call is in-progress an arbitrary time after said incoming call was authorized.

18. The method of claim 11, wherein:
associating said parameters with said control codes includes associating a first set of said parameters with a first set said of control codes in a first unit and associating a second set of said parameters with a second set of said control codes in a second unit;
associating said control codes with passwords includes associating said first and second control codes with the same said password; and
controlling said parameter includes controlling said first and second parameters independently in said first and second units, respectively, according to said first and second control codes without intervention by said call recipient.

* * * * *